(12) United States Patent
Nakhasi et al.

(10) Patent No.: US 8,372,465 B2
(45) Date of Patent: Feb. 12, 2013

(54) OIL COMPOSITIONS OF STEARIDONIC ACID

(75) Inventors: Dilip K. Nakhasi, Bourbonnais, IL (US); Danielle N. Corbin, Richton Park, IL (US); Roger L. Daniels, Manhattan, IL (US)

(73) Assignee: Bunge Oils, Inc., St. Louis, MO (US)

( * ) Notice: Subject to any disclaimer, the term of this patent is extended or adjusted under 35 U.S.C. 154(b) by 332 days.

(21) Appl. No.: 12/707,603

(22) Filed: Feb. 17, 2010

(65) Prior Publication Data
US 2011/0200735 A1 Aug. 18, 2011

(51) Int. Cl.
A23D 9/00 (2006.01)
(52) U.S. Cl. .......................... 426/606; 426/607
(58) Field of Classification Search .................. 426/606, 426/607
See application file for complete search history.

(56) References Cited

U.S. PATENT DOCUMENTS

| | | | |
|---|---|---|---|
| 4,999,380 A | 3/1991 | Berger et al. | |
| 5,130,449 A | 7/1992 | Lagarde et al. | |
| 5,158,975 A | 10/1992 | Guichardant et al. | |
| 5,223,285 A | 6/1993 | DeMichele et al. | |
| 5,518,753 A | 5/1996 | Bracco et al. | |
| 5,886,037 A | 3/1999 | Klor et al. | |
| 5,965,755 A | 10/1999 | Sornyk et al. | |
| 6,020,020 A * | 2/2000 | Cain et al. | 426/601 |
| 6,087,353 A | 7/2000 | Stewart et al. | |
| 6,117,475 A | 9/2000 | Van Amerongen et al. | |
| 6,139,897 A | 10/2000 | Goto et al. | |
| 6,159,523 A * | 12/2000 | Cain et al. | 426/601 |
| 6,169,190 B1 | 1/2001 | Lanuza et al. | |
| 6,277,431 B1 | 8/2001 | Berry et al. | |
| 6,297,279 B1 * | 10/2001 | Wang et al. | 514/560 |
| 6,331,568 B1 | 12/2001 | Horrobin | |
| 6,340,485 B1 | 1/2002 | Coupland et al. | |
| 6,340,705 B1 | 1/2002 | Obukowicz et al. | |
| 6,459,018 B1 | 10/2002 | Knutzon | |
| 6,599,939 B2 * | 7/2003 | Wang et al. | 514/558 |
| 6,667,064 B2 | 12/2003 | Surette | |
| 7,045,143 B1 * | 5/2006 | Sawatzki et al. | 424/439 |
| 7,163,960 B2 | 1/2007 | Ursin et al. | |
| 7,195,914 B2 | 3/2007 | Surette | |
| 2002/0031595 A1 | 3/2002 | Wester | |
| 2002/0045000 A1 | 4/2002 | Nakajima | |
| 2002/0048606 A1 | 4/2002 | Zawistowski | |
| 2005/0266051 A1 | 12/2005 | Kelley et al. | |
| 2006/0110521 A1 | 5/2006 | Heise et al. | |
| 2006/0111254 A1 | 5/2006 | Makadia et al. | |
| 2006/0111578 A1 | 5/2006 | Arhancet et al. | |
| 2006/0154986 A1 * | 7/2006 | Finley et al. | 514/547 |
| 2006/0156435 A1 | 7/2006 | Ursin et al. | |
| 2007/0207223 A1 | 9/2007 | DiRienzo et al. | |
| 2007/0218183 A1 | 9/2007 | Nakhasi et al. | |
| 2007/0220634 A1 | 9/2007 | Metz | |
| 2008/0063691 A1 | 3/2008 | Ursin et al. | |
| 2009/0023808 A1 | 1/2009 | Raman et al. | |
| 2010/0266746 A1 * | 10/2010 | Wilkes | 426/603 |

FOREIGN PATENT DOCUMENTS

| | | |
|---|---|---|
| EP | 1714564 A1 | 10/2006 |
| WO | WO 01/13733 | 3/2001 |
| WO | WO 01/32029 | 5/2001 |
| WO | WO 01/91587 | 12/2001 |
| WO | WO 03/099216 | 12/2003 |
| WO | WO 2008/005841 | 1/2008 |
| WO | WO2008026909 A1 | 3/2008 |
| WO | WO 2008/085840 | 7/2008 |

OTHER PUBLICATIONS

Hui, Y.H. 1996. Bailey's Industrial Oil and Fat Products, 5th edition, vol. 1. John Wiley & Sons, Inc., New York. p. 484-485.*
Swern, D. 1979. Bailey's Industrial Oil and Fat Products, vol. 1, 4$^{th}$ edition. John Wiley & Sons, New York. 315-316.*
Berti et al., "Echium: a source of stearidonic acid adapted to the northern great plains in the US," Issues in new crops and new uses, J. Janick and A. Whipkey (cds.), ASHS Press, Alexandria, VA, pp. 120-125 (2007).
Callaway et al., "Occurrence of "omega-3" stearidonic acid (cis-6,9,12,15-octadecatetraenoic acid) in hemp (*Cannabis sativa* L.) seed," J. Int. Hemp Assoc. 3(2):61-63 (1996).
Clough, "Sources and production of specialty oils containing GLA and stearidonic acid," Lipid Technol. 5(3):9-12 (2001).
Coupland, "Stearidonic acid: A plant produced omega-3 PUFA and a potential alternative for marine oil fatty acids," Lipid Technology 20(7):152-154 (Jul. 2008).
Coupland et al., "Stearidonic acid containing plant-seed oils: Their potential for use in healthy foods," 93rd AOCS Annual meeting and Expo, May 5-8, Montreal, Quebec, Canada (2002).
Coupland,"Nutraceuticals derived from lipid-containing n-3 and n-6 polyunsaturated fatty acids," Lipid Research Centre, The University of Hull, (Dec. 4, 2009).
CRODA Chemicals Europe Ltd., "Application for the approval of refined echium oil (stearidonic acid-rich oil from *Echium plantagineum*)," Cowick Hall, Snaith, Goole, East Yorkshire, DN14 9AA, 57 pages (Aug. 4, 2006).
Harris et al., "Stearidonic acid increases the red blood cell and heart eicosapentaenoic acid content in dogs," Lipids 42:325-333 (2007).
Harris et al., "Stearidonic acid-enriched soybean oil increased the omega-3 index, an emerging cardiovascular risk maker," Lipids 43:805-811 (2008).
Horia et al., "Comparison of stearidonic acid and α-linolenic acid on $PGE_2$ production and COX-2 protein levels in MDA-MB-231 breast cancer cell cultures," Journal of Nutritional Biochemistry 16:184-192 (2005).

(Continued)

*Primary Examiner* — Carolyn Paden
(74) *Attorney, Agent, or Firm* — Jones Day

(57) ABSTRACT

Provided herein are oil compositions comprising an interesterified structured lipid component, the component being an interesterifcation reaction product of an amount of a medium chain triglyceride, an amount of a long chain domestic oil, and an amount of a source of stearidonic acid. The structured lipid component can be used in edible oil compositions. The oil compositions can contain an amount of a phytosterol ester component. The oil compositions disclosed herein have good stability and also have other properties useful for an edible oil composition.

8 Claims, No Drawings

OTHER PUBLICATIONS

Ingale et al., "Dietary Energy Value of Medium-Chain Triglycerides," Journal of Food Science, 64(6):960-963 (1999).

Ishihara et al., "Comparison of the effects of dietary a-linolenic, stearidonic, and eicosapentaenoic acids on production of inflammatory mediators in mice," Lipids 37(5):481-186 (2002).

James et al., "Metabolism of stearidonic acid in human subjects: comparison with the metabolism of other n-3 fatty acids[1-3]," The American Journal of Clinical Nutrition 77:1140-1145 (2003).

King (John K. King & Sons Limited, Echium Oil Food Application, 107 pages (Oct. 4, 2000).

Kuklev et al., "Chemical C2-elongation of polyunsaturated fatty acids," Chemistry and Physics of Lipids 3589, 6 pages (2006).

Little et al., "Dietary n-3 PUFA promote endurance training and fat loss in male mice," Purdue University, Department of Basic Medical Sciences and Department of Food Science, Purdue University, West Lafayette, Indiana (Dec. 4, 2009).

Miles et al., "The influence of different combinations of γ-linolenic acid, stearidonic acid and EPA on immune function in healthy young male subjects," British Journal of Nutrition 91:893-903 (2004).

Miles et al., "The influence of different combinations of γ-linolenic, stearidonic and eicosapentaenoic acids on the faccty acid composition of blood lipids and mononuclear cells in human volunteers," Prostaglandins, Leukotrienes and Essential Fatty Acids 70:529-538 (2004).

Miles et al., "Self-reported health problems in young male subjects supplementing their diet with oils rich in eicosapentaenoic, γ-linolenic and stearidonic acids," Prostaglandins, Leukotrienes and Essential Fatty Acids 75:57-60 (2006).

Miller et al., "Replacement of dietary fish oil for Atlantic salmon parr (Salmo salar L.) with a stearidonic acid containing oil has no effect on omega-3 long-chain polyunsaturated fatty acid concentrations," Comparative Biochemistry and Physiology, Part B 146:197-206 (2007).

Simopoulos A.P., "Essential fatty acids in health and chronic disease," Am. J. Clin. Nutr. 70:560-569 (1999).

Surette et al., "Dietary Echium oil increases plasma and neutrophil long-chain (n-3) fatty acids and lowers serum triacylglycerols in hypertriglyceridemic humans," The Journal of Nutrition, Human Nutrition and Metabolism, pp. 1406-1411 (2004).

Surette et al., "The evaluation of dietary stearidonic acid-containing oils and biopeptides on tissue lipid composition and indices of health and disease in mice," Half-term report prepared for Marialuci Almeida, PhD, Bunge Oil Center of Excellence, Department of Chemistry and Biochemistry, University of Moncton, NB, Canada (Apr. 4, 2007).

Traul et al., "Review of the toxicologic properties of medium-chain triglyceride," Food and Chemical Toxicology, 38:79-98 (2000).

Ursin, "Plant lipds for human health: development of functional land-based omega-3 fatty acids," Symposium: Improving human nutrition through genomics, proteomics and biotechnologies, The Journal of Nutrition, American Society for Nutritional Science, pp. 4271-4274 (2003).

Watkins, "Essential fatty acids (2groups): Linoleic acid n-6 and the n-3 PUFA: The n-3 fatty acid called DHA is absolutely essential for brain and retina development; socialization and behavior," Safety and use of nutraceutical fatty acids, Purdue University, Center for Enhancing foods to protect health, Lipid chemistry & molecular biology laboratory (Jul. 2004).

Wu et al., "Effect of dietary supplementation with black currant seed oil on the immune response of healthy elderly subjects," The Americal Journal of Clinical Nutrition 70:536-543 (1999).

* cited by examiner

OIL COMPOSITIONS OF STEARIDONIC ACID

FIELD

Provided herein are oil compositions comprising stearidonic acid. In certain embodiments, the compositions provided herein are structured lipids comprising stearidonic acid in which the stearidonic acid has improved stability. Also provided are uses of the compositions and methods of making such oil compositions.

BACKGROUND

Stearidonic acid (SDA, 18:4n-3) is a highly unsaturated omega-3 fatty acid. SDA is very important in human nutrition because it is an intermediate in the biosynthesis of omega-3-fatty acids, eicosapentanoic (EPA) and docosahexaenoic (DHA) acids. Both of these omega-3 fatty acids are required in human diets for cell membrane functioning and good health (Coupland and Hebard, Stearidonic acid containing plant-seed oils: Their potential for use in healthy foods, 93*rd AOCS Annual meeting and Expo*, May 5-8, 2002, Montreal, Quebec, Canada.). Higher intake of omega-3 fatty acids has been positively associated with the prevention of cardiovascular diseases, arthritis, inflammatory diseases, and autoimmune diseases in humans (Simopoulos A. P., 1999, Essential fatty acids in health and chronic disease, *Am. J. Clin. Nutr.* 70:560-569.).

Stearidonic acid is found in other *Echium* species (*E. vulgare* L.), hemp seed (*Cannabis sativa* L., *Cannabaceae*) (2%-3%) (Callaway et al. 1996, Occurrence of "omega-3" stearidonic acid (cis-6,9,12,15-octadecatetraenoic acid) in hemp (*Cannabis sativa* L.) seed, *J. Int. Hemp Assoc.* 3(2):61-63.), and blackcurrant seed (*Ribes nigrum* L., *Grossulariaceae*) (about 2%) (Clough 1993, Sources and production of specialty oils containing GLA and stearidonic acid, *Lipid Technol.* 5(3):9-12)).

Because of the health benefits of SDA, several researches have tried to prepare products that incorporate SDA. There is a continuing need for stable oil products with SDA.

SUMMARY

In certain embodiments, provided herein are structured lipids comprising SDA. In certain embodiments, provided herein are oil compositions comprising the structured lipids. In certain embodiments, the oil compositions are used in place of, or in combination with, conventional edible oil products such as domestic oils.

The structured lipid provided herein is a product of the interesterification of an edible domestic oil, a medium chain triglyceride, and source of SDA.

In certain embodiments, the structured lipids provided herein are combined with phytosterol esters.

The structured lipid provided herein is a reaction product of an interesterification reactant charge, wherein the reactant charge comprises an amount of a medium chain triglyceride having fatty acid chains from 6 to 12 carbon atoms in length, an amount of a long chain domestic oil having fatty acid chains of at least 16 carbon atoms in length, and an amount of a source of SDA.

In certain embodiments, the oil compositions provided herein optionally comprise a phytosterol ester component, and optionally one or more other edible oils.

The structured lipid compositions provided herein are useful in various food systems, especially for baking, sauteing, stir-frying and as an oil component of a dressing, a marinate or other product that is used and/or stored at room temperature or refrigerated temperatures.

In certain embodiments, provided herein is a process for incorporating SDA in a structured lipid. In certain embodiments, the process comprises randomized interesterification of a medium chain triglyceride, a source of SDA and a long chain edible oil. In certain embodiments, the source of SDA comprises *Echium* oil. In one embodiment, the source of SDA is *Echium* oil.

In certain embodiments, the oil compositions provided herein further comprise a phytosterol.

DETAILED DESCRIPTION

Provided herein are compositions comprising SDA. Further provided are methods of making the compositions and uses of the compositions. The methods and compositions are described in detail in the sections below.

Definitions

Unless defined otherwise, all technical and scientific terms used herein have the same meaning as is commonly understood by one of ordinary skill in the art. All patents, applications, published applications and other publications are incorporated by reference in their entirety. In the event that there are a plurality of definitions for a term herein, those in this section prevail unless stated otherwise.

As used herein, interesterification is a known reaction of triacylglycerol structures whereby individual fatty acid structures at positions of the triglyceride being interesterified are interchanged on the glycerol moiety.

As used herein, random interesterification is interesterification whereby individual fatty acid structures are interchanged randomly on the glycerol moiety.

As used herein, structured lipids are triacylglycerols that have been modified to change the fatty acid composition and/or their positional distribution on glycerol backbone by chemically and/or enzymatically catalyzed reactions and/or genetic engineering. In one embodiment, structured lipids are modified triacylglycerols with improved nutritional or functional properties.

As used herein, a reaction charge refers to reactants in the interesterification reaction provided herein, including a medium chain triglyceride (MCT) having fatty acid chains from C6 to C12 in length, a long chain domestic oil having fatty acid chains of at least C16 in length, and a source of SDA.

Compositions

In certain embodiments, provided herein are compositions comprising structured lipids prepared by chemical interesterification of a medium chain triglyceride, a domestic oil, and a source of SDA.

In certain embodiments, the source of SDA in the structured lipids provided herein is *Echium* oil. In certain embodiments, amount of *Echium* oil used in the interesterification reaction is about 20-50% based on total weight of the reactants. In certain embodiments, amount of *Echium* oil used in the interesterification reaction is about 20%, 25%, 30%, 35% or 40% based on total weight of the reactants. In one embodiment, amount of *Echium* oil used in the interesterification reaction is about 30% based on total weight of the reactants.

The use of MCTs in human diet has been well documented in the literature. For example, see, Traul et al., "Review Of The Toxicologic Properties Of Medium-Chain Triglyceride", *Food and Chemical Toxicology,* 38, pages 79-98 (2000) and Ingale et al., "Dietary Energy Value of Medium-Chain Triglycerides", *Journal of Food Science*, Volume 64, No. 6, pages 960-963 (1999) According to Traul et al., the safety of MCTs in human dietary consumption has been indicated up to levels of 1 gram per kilogram of body weight.

In certain embodiments, the medium chain triglycerides or "MCT" used in the interesterification process are produced commercially by splitting and distilling fatty acids from coconut or palm kernel oils. In certain embodiments, production of medium chain triglycerides includes esterification with glycerine to form a triglyceride having fatty acid chain lengths of from C6 to C12. The edible oils, for example, coconut or palm kernel oils typically contain about 4 to 8 weight percent of C8 caprylic fatty acids and between about 3 and about 7 weight percent of C10 capric fatty acids. Minor levels, typically between about 1 and about 2 weight percent, of either or both of C6 caproic fatty acids and C12 lauric fatty acids can be present in some such products.

Exemplary medium chain triglyceride products include some NEOBEE® products such as NEOBEE® M-5 (trademark and product of Stepan Company), Aldo MCT (trademark and product of Lonza Inc.), CAPTEX® 300 (trademark and product of Abitec Corp.), and MIGLYOLO 812 (trademark and product of Clionova, Inc.).

In certain embodiments, the amount of MCT used in the interesterification reaction is about 25-45% based on total weight of the reactants. In certain embodiments, the amount of MCT used in the interesterification reaction is about 25%, 30%, 35%, 40% or 45% based on total weight of the reactants. In one embodiment, the amount of MCT used in the interesterification reaction is about 35% based on total weight of the reactants.

The structured lipids provided herein further comprise domestic oils. Domestic oils for use herein include soybean oil, corn oil, cottonseed oil, canola oil, safflower oil, sunflower oil, peanut oil, olive oil, oil from grain plants, and identity preserved oils such as identity preserved canola oil and the like. The edible oil for use herein is a liquid oil. In certain embodiments, the oil is used without Hydrogenation. The domestic oils used herein are also known as long chain lipids. In certain embodiments, the chain lengths of the domestic oils is between C16 and C22.

In certain embodiments, the domestic oils for use herein are substantially unsaturated oils. In one embodiment, the domestic oils comprise soybean, corn, cottonseed or canola oil. In certain embodiments, the domestic oils are specialty oils including identity preserved canola oils and refined, bleached and deodorized high stable oils. One such suitable oil is a low-linolenic acid soybean oil sold under the trademark Nutrium®, available from Bunge DuPont Biotech Alliance, St. Louis, Mo. Further example are described in Sornyk et al., U.S. Pat. No. 5,965,755 and Lanuza et al., U.S. Pat. No. 6,169,190, incorporated herein by reference.

In certain embodiments, the amount of domestic oil used in the interesterification reaction is about 25-45% based on total weight of the reactants. In certain embodiments, the amount of domestic oil used in the interesterification reaction is about 25%, 30%, 35%, 40% or 45% based on total weight of the reactants. In one embodiment, the amount of domestic oil used in the interesterification reaction is about 35% based on total weight of the reactants.

In certain embodiments, the structured lipids comprising SDA provided herein are stable for about 1, 2, 3, 4, 5, 6 weeks or more. In certain embodiments, the structured lipids comprising SDA provided herein are stable for about 1, 2, 3, 4, 5, 6, 7, 8, 9, 10, 11, 12, 15, 20, 24, 28, 30, 36, 40, 48 months or more. The stability of the structured lipids can be measured by using methods known to one of skill in the art. In certain embodiments, the stability is measured by analytical analyses of free fatty acid, anisidine value, peroxide value, oxidative stability, color, and FAME for the structured lipids provided herein. In certain embodiments, the structured lipids provided herein are more stable than *Echium* oil and/or a physical blend of high oleic canola oil, MCT, and *Echium* oil.

Methods of Preparation

In certain embodiments, provided herein is a process for preparing the structured lipids. In certain embodiments, the process provided herein involves charging the reactants including a source of SDA, a medium chain triglyceride and a domestic oil, into an interesterification reactor vessel. In certain embodiments, such vessels have means for heating the reactants during agitation and under reduced pressure or vacuum conditions. In one embodiment, the reaction is carried out in the presence of a suitable interesterification catalyst and typically proceeds rapidly to completion or substantial completion. In certain embodiments, the interesterification is a reaction to or toward complete randomization, which would equate to a degree of interesterification of 100% of the fatty acyl chains.

In certain embodiments, the interesterification catalysts include metal alkoxides, alkali metals, alkali metal alloys, and metal hydroxides. In certain embodiments, the alkoxides include alkali metal alkoxides, such as sodium methoxide, sodium ethoxide, potassium methoxide and potassium ethoxide. In certain embodiments, the alkali metals include sodium. In certain embodiments, the alkali metal alloys include sodium/potassium alloy. In certain embodiments, the metal hydroxides include alkali metal hydroxides such as sodium hydroxide and potassium hydroxide. In one embodiment, the catalyst is sodium methoxide. In certain embodiments, the catalyst is present in less than 1% by weight of the interesterification mixture, in certain embodiments less than 0.5%, or less than 0.2%.

Once the interesterification has proceeded to form the desired structured lipid, steps can be taken to modify the conditions away from reaction conditions. In certain embodiments, the modifications include inactivating the catalyst, reducing the temperature, reducing the vacuum applied, ceasing agitation, or any combination of these changes. Accomplishing these changes will be appreciated by those skilled in the art.

In certain embodiments, the reaction temperature during the interesterification reaction ranges about 85° C. to about 92° C. (about 185° F. to about 197° F.). In one embodiment, the temperature for the reaction is about 88° C. (191° F.). In certain embodiments, the reaction is conducted under vacuum.

In certain embodiments, the reaction time for interesterification is between about 30 minutes and about 2 hours. In one embodiment, the reaction time is about 30, 45, or 55 minutes. In one embodiment, the reaction time is about 45 minutes. This reaction time can be controlled, for example, by timed neutralization of the catalyst. Neutralization of a catalyst such as sodium methoxide can be accomplished with by any method known to one of skill in the art. In one embodiment, neutralization of sodium methoxide is accomplished with about 0.5 to 0.7 weight percent of citric acid solution of about 50% strength or about 0.59 weight percent of citric acid solution of about 50% strength. The duration of the neutralization phase, in one embodiment, is about 20 minutes, although longer or shorter times may be used depending upon the particular reactants and catalyst used.

The interesterified structured lipid can be treated to remove any residual soaps and/or to remove all the color bodies, if needed. These include filter aids and silica sources such as TRISYL® S-615 (trademark, available from W. R. Grace & Co.) used for the refining of vegetable oil. Color removal can be with a bleaching earth or the like. In certain embodiments, the structured lipid is subjected to deodorization using approaches generally known in the art.

In certain embodiments, the deodorization is conducted by maintaining the reaction product at a temperature of about 214° C.-226° C. (417.2° F.-438.8° F.) under a vacuum of about 0.114-0.870 mbar for about 3-5 or about 4 hours.

In certain embodiments, the interesterified structured lipid can be combined with one or more phytosterol esters to form a composition which can be used directly as an edible oil product, or also be combined with other components to make up the desired final product, as will be generally appreciated by those skilled in the art. For example, this can include combining the composition with one or more other edible oils and other food components in recipes for consumable foods and the like.

In certain embodiments, provided herein are compositions comprising the structured lipid at levels between about 88 and about 98 weight percent, based upon the total weight of the product; in certain embodiments, in the range of between about 90 and about 96 weight percent; and in certain embodiments, between about 92 and about 94 weight percent. The phytosterol ester component can be included at levels between about 2 and about 12 weight percent; in certain embodiments, between about 4 and about 10 weight percent; and in certain embodiments, between about 6 and about 8 weight percent, all based on total weight of the composition. One or more additional edible oils also can be used.

Exemplary phytosterol ester compositions can be found in U.S. Pat. Nos. 6,117,475, 6,139,897, 6,277,431, US Patent Application Publications Nos. 2002/0031595 and 2002/0045000, and International Publications Nos. WO 01/13733, WO 01/32029 and WO 01/91587. Specific details concerning phytosterol esters and microparticles of phytosterol esters are found in U.S. Pat. No. 6,087,353 and U.S. Patent Application Publication No. 2002/0048606. Each of these patents and patent publications is incorporated by reference hereinto.

The phytosterol components that can be used in the compositions provided herein encompass phytosterols and/or phytostanols or derivatives of these types of compounds. It is recognized that the presence of the sterol component is useful in lowering serum cholesterol and serum triglyceride levels, as well as enhancing overall dietary efficacy. Without being bound to any particular theory, this can be explained by similarities between their respective chemical structures. By this explanation, the phytosterol displaces cholesterol from the micellar phase, thereby reducing cholesterol absorption and/or competing with receptor and/or carrier sites in the cholesterol absorption process.

Examples of compounds which fall within a meaning of phytosterol include sitosterol, campesterol, stigmasterol, brassicasterol, demosterol, chalinosterol, poriferasterol, coioanasterol, and natural or synthesized forms or derivatives, including isomers. Also included are compounds identified by the term phytostanol, including saturated or hydrogenated phytosterols and all natural or synthesized forms and derivatives, including the isomers. It will be appreciated that these components can be modified, such as by adding side chains, and also fall within the purview of the term phytosterol.

Phytosterols are typically obtained from natural sources, most typically from the processing of plant oils. Sources include corn oil, wheat germ oil, soy extract, rice extract, rice bran, canola oil and sesame oil, walnut oil, other nut oils, peanut oil, and all vegetable source oils. Other sources can include tall oil pitch or soap such as those which are byproducts of the forestry industry, which are called wood sterols.

Phytosterol esters are available from public sources, including from Forbes Medi-Tech, Inc. An example is the phytosterol product sold under the name REDUCOL®, a registered trademark of Forbes Medi-Tech, Inc. Compositions are sold under this brand name as cholesterol lowering agents. A typical such composition is composed of plant sterols and stanols having 14.5% campesterol, 2.4% campostanol, 50.9% beta-sitosterol, and 18.9% sitostanol. The REDUCOL® product is a fine crystalline waxy powder. Its particle size characteristic is such that greater than 80% of the particles pass through a 0.8 mm sieve and greater than 98% of the particles pass through a 2.0 mm sieve. PHYTROL®. phytosterol compositions comprise from 38 to 79 weight percent sitosterol, based on the total weight of the anhydrous composition, 4 to 25 weight percent of campesterol, 6 to 18 weight percent sitostanol, and 0 to 14 weight percent campostanol. At least 97 weight percent of the components are in the form of a sterol ester, and no more than 3 weight percent are free sterols. An exemplary sterol ester in this regard is a phyto-S-sterol-10 ester. Such has a softening point of between 15° C. and 30° C. and is substantially insoluble in water at 25° C. Such a sterol ester is liquid above 40° C.

In certain embodiments, the quantity of stanol structures included in the phytosterol component is minimum, in certain embodiments, no greater than about 20, 15, 10 or 5 weight percent, based upon the total weight of the phytosterol ester component.

Uses of Compositions

The compositions provided herein can be formulated into food products to provide stabilized SDA, and, where phytosterol esters are used, to provide adequate levels of phytosterols delivered into the body in order to reduce total cholesterol adsorption. In addition, the MCT structure fosters the oil metabolism through the hepatic system rather than through the lymphatic system, leading to reduced adipose tissue deposition for these oil products when compared with products incorporating similar quantities of other oils. The compositions also are intended to increase components of energy expenditure and substrate oxidation. In addition, the SDA is believed to provide unique health benefits. The SDA is stabilized when interesterified as described above, so that such food products will have a greater stability than those using *Echium* oil or a physical blend of high oleic canola oil, MCT, and *Echium* oil.

The structured lipid compositions described herein provide excellent compositions for edible oil products having good clarity, physical properties for such uses, and low trans-isomer levels. The compositions described herein provide a healthy oil that delivers salad oil, pan frying and baking functionality while providing health benefits directly associated with the presence of SDA. In certain embodiment, the structured lipids comprising SDA provided herein is used in baked goods, dairy products, spreads, margarines, sports products, nutrition bars and infant formulas, feed, aquaculture, neutraceutical and medicinal products.

Administration of the structured lipid-based, phytosterol ester-containing oil composition provided herein can be made at advantageous levels when included within a monitored diet. In one embodiment, administration dose is at least about 0.4 grams of the oil composition per kilogram of body weight per day. In one embodiment, administration range is between about 0.8 and about 1 gram of this oil per kilogram of body weight per day. In an exemplary monitored diet, 40% of the total energy (approximated by calories) in the diet originate from fat, 45% of the energy from carbohydrates, and 15% of the energy from protein sources. Of the fat source, 70% can be provided by the structured lipid composition.

The following examples present certain exemplary embodiments and are intended by way of illustration and not by way of limitation. In each of the examples herein, percentages indicate weight percent of the total mixture, unless otherwise indicated.

EXAMPLES

Examples 1-6

In each of Examples 1-6, an interesterification charge of High Oleic Canola Oil, Medium Chain Triglycerides and *Echium* oil was placed in an interesterification reaction chamber along with 0.125% by weight of 95% pure sodium methoxide powder, in the proportions set forth in Table 1 below. The chamber was brought to a temperature of 85° C.-92° C. (185° F.-197° F.) with a target temperature of 88° C. (191° F.). The reaction was run under a vacuum (about 4-75 mmHg, or about 18-22 mmHg) for approximately 45 minutes. The reaction mixture was then neutralized with 0.59% by weight percent of the total reaction mixture of 50% citric acid; neutralization continued for about 20 minutes. The neutralized reaction charge was then treated with 0.5 weight percent Trisyl S-615 and 0.5 filter aid at 90° C.-94° C. (194° F.-201° F.), with mixing for about 10 minutes to remove soaps. Following the removal of soaps, the reaction mixture was treated with 0.5% bleaching earth and 0.5% filter aid, if needed, to remove color bodies. The reaction mixture was then subjected to a deodorization step by being maintained at a temperature of 214° C.-226° C. (417.2° F.-438.8° F.) under a vacuum of about 0.114-0.870 mbar for about 4 hours. The deodorization temperature was lower than is typical for such reaction products, due to the volatility of SDA.

TABLE 1

| Example # | Echium Oil (gms) | MCT (gms) | Canola (gms) |
|---|---|---|---|
| 1 | 128.81 | 150.61 | 150.61 |
| 2 | 1050 | 1225 | 1225 |
| 3 | 600 | 700 | 700 |
| 4 | 870 | 1015 | 1015 |
| 5 | 660 | 770 | 770 |
| 6 | 495 | 577.5 | 577.5 |

Example 7

Stability Studies

In this experiment, the stability of the compositions prepared as described in Examples 1-6 above was studied and compared with i) *echium* oil, and ii) a physical blend of high oleic canola oil, MCT, and *Echium* oil, by analyzing free fatty acid, anisidine value, peroxide value, oxidative stability, color, and FAME.

The samples for this study were setup using 32 oz high density polyethylene (HDPE) bottles that contained approximately 2 pounds of oil blanketed with nitrogen. Prior to the samples being dispensed, 200 ppm of tent butylhydroquinone (TBHQ) was added to the physical blend and interesterified oils. The three oil categories were placed into three storage temperatures 70° F., 85° F., and 100° F. The pull dates for the samples were as follows: weeks 2, 4, 6, 8, and 10. The samples were pulled from their respectively marked bottle and were submitted for analytical analyses which included free fatty acid, anisidine value, peroxide value, oxidative stability, color, and Fatty Acid Methyl Ester (FAME). The FAME was run using the fish oil method in order to detect the SDA within the oil (AOCS method #Ce li-07).

The peroxide values for the samples are provided in Table 2.

TABLE 2

Physical vs. Interesterified Blend Peroxide Values

| | 70° F. | | | 85° F. | | | 100° F. | | |
|---|---|---|---|---|---|---|---|---|---|
| | Pure *Echium* | Physical | Interesterified | Pure *Echium* | Physical | Interesterified | Pure *Echium* | Physical | Interesterified |
| Time Zero | 1.2 | 1.0 | 0.6 | 1.2 | 1.0 | 0.6 | 1.2 | 1.0 | 0.6 |
| 2 wk | 1.0 | 1.2 | 1.2 | 0.6 | 2.2 | 1.6 | 1.6 | 1.4 | 1.8 |
| 4 wk | 4.0 | 2.0 | 1.0 | 4.4 | 2.0 | 1.6 | 5.0 | 2.4 | 2.2 |
| 6 wk | 4.8 | 3.6 | 1.4 | 5.4 | 2.6 | 2.0 | 5.2 | 2.8 | 1.8 |
| 8 wk | 4.7 | 1.2 | 1.0 | 4.9 | 1.6 | 1.6 | 4.9 | 2.0 | 3.2 |
| 10 wk | 4.4 | 2.0 | 1.4 | 8.4 | 2.0 | 2.2 | 8.2 | 2.4 | 3.8 |
| Average | 3.4 | 1.8 | 1.1 | 4.2 | 1.9 | 1.6 | 4.4 | 2.0 | 2.2 |
| Standard Deviation | 1.77 | 0.97 | 0.30 | 2.88 | 0.55 | 0.55 | 2.60 | 0.68 | 1.13 |

Free Fatty Acid values for the samples are provided in Table 3.

TABLE 3

Physical vs. Interesterified Blend Free Fatty Acid Values

| | 70° F. | | | 85° F. | | | 100° F. | | |
|---|---|---|---|---|---|---|---|---|---|
| | Pure *Echium* | Physical | Interesterified | Pure *Echium* | Physical | Interesterified | Pure *Echium* | Physical | Interesterified |
| Time Zero | 0.24 | 0.06 | 0.06 | 0.24 | 0.06 | 0.06 | 0.24 | 0.06 | 0.06 |
| 2 wk | 0.23 | 0.07 | 0.07 | 0.25 | 0.07 | 0.08 | 0.25 | 0.07 | 0.07 |
| 4 wk | 0.22 | 0.10 | 0.07 | 0.21 | 0.08 | 0.09 | 0.23 | 0.08 | 0.08 |
| 6 wk | 0.23 | 0.07 | 0.07 | 0.22 | 0.06 | 0.07 | 0.23 | 0.07 | 0.07 |

TABLE 3-continued

Physical vs. Interesterified Blend Free Fatty Acid Values

| | 70° F. | | | 85° F. | | | 100° F. | | |
|---|---|---|---|---|---|---|---|---|---|
| | Pure *Echium* | Physical | Interesterified | Pure *Echium* | Physical | Interesterified | Pure *Echium* | Physical | Interesterified |
| 8 wk | 0.23 | 0.11 | 0.11 | 0.23 | 0.10 | 0.09 | 0.23 | 0.10 | 0.10 |
| 10 wk | 0.20 | 0.07 | 0.08 | 0.21 | 0.09 | 0.07 | 0.22 | 0.09 | 0.07 |
| Average | 0.23 | 0.08 | 0.08 | 0.23 | 0.08 | 0.08 | 0.23 | 0.08 | 0.08 |
| Standard Deviation | 0.01 | 0.02 | 0.02 | 0.02 | 0.02 | 0.01 | 0.01 | 0.01 | 0.01 |

Oxidative Stability Index (OSI) values for the samples are provided in Table 4.

TABLE 4

Physical vs. Interesterified Blend Oxidative Stability Values

| | 70° F. | | | 85° F. | | | 100° F. | | |
|---|---|---|---|---|---|---|---|---|---|
| | Pure *Echium* | Physical | Interesterified | Pure *Echium* | Physical | Interesterified | Pure *Echium* | Physical | Interesterified |
| Time Zero | 0.85 | 22.20 | 18.45 | 0.85 | 22.20 | 18.45 | 0.85 | 22.20 | 18.45 |
| 2 wk | 0.85 | 21.85 | 18.10 | 0.85 | 21.85 | 17.25 | 0.95 | 21.50 | 17.00 |
| 4 wk | 0.80 | 22.45 | 17.25 | 0.70 | 21.85 | 16.90 | 0.70 | 20.85 | 16.20 |
| 6 wk | 0.70 | 21.60 | 17.30 | 0.65 | 22.05 | 16.55 | 0.70 | 20.55 | 15.45 |
| 8 wk | 0.75 | 22.50 | 15.80 | 0.65 | 21.75 | 16.60 | 0.65 | 20.40 | 14.55 |
| 10 wk | 0.60 | 21.30 | 17.55 | 0.60 | 20.80 | 16.00 | 0.60 | 20.00 | 13.45 |
| Average | 0.76 | 21.98 | 17.41 | 0.72 | 21.75 | 16.96 | 0.74 | 20.92 | 15.85 |
| Standard Deviation | 0.10 | 0.48 | 0.92 | 0.11 | 0.49 | 0.84 | 0.13 | 0.80 | 1.78 |

Anisidine values for the samples are provided in Table 5.

TABLE 5

Physical vs. Interesterified Blend Anisidine Values

| | 70° F. | | | 85° F. | | | 100° F. | | |
|---|---|---|---|---|---|---|---|---|---|
| | Pure *Echium* | Physical | Interesterified | Pure *Echium* | Physical | Interesterified | Pure *Echium* | Physical | Interesterified |
| Time Zero | 10.68 | 6.62 | 1.53 | 10.68 | 6.62 | 1.53 | 10.68 | 6.62 | 1.53 |
| 2 wk | 9.60 | 6.34 | 1.33 | 9.79 | 6.08 | 1.28 | 10.31 | 6.89 | 1.95 |
| 4 wk | 9.98 | 6.77 | 2.12 | 10.5 | 6.74 | 3.28 | 11.08 | 6.66 | 2.12 |
| 6 wk | 10.38 | 6.65 | 1.45 | 10.58 | 6.56 | 1.57 | 12.33 | 6.17 | 1.84 |
| 8 wk | 10.25 | 6.05 | 1.10 | 9.86 | 6.37 | 1.42 | 11.67 | 6.38 | 2.38 |
| 10 wk | 10.00 | 5.66 | 1.81 | 10.87 | 6.43 | 1.43 | 13.72 | 5.97 | 2.01 |
| Average | 10.15 | 6.35 | 1.56 | 10.38 | 6.47 | 1.75 | 11.63 | 6.45 | 1.97 |
| Standard Deviation | 0.37 | 0.43 | 0.36 | 0.45 | 0.23 | 0.76 | 1.25 | 0.34 | 0.28 |

Yellow values for the samples are provided in Table 6.

TABLE 6

Physical vs. Interesterified Blend Yellow Values

| | 70° F. | | | 85° F. | | | 100° F. | | |
|---|---|---|---|---|---|---|---|---|---|
| | Pure *Echium* | Physical | Interesterified | Pure *Echium* | Physical | Interesterified | Pure *Echium* | Physical | Interesterified |
| Time Zero | 26.0 | 5.6 | 15.0 | 26.0 | 5.6 | 15.0 | 26.0 | 5.6 | 15.0 |
| 2 wk | 28.0 | 6.4 | 18.0 | 26.0 | 6.6 | 19.0 | 26.0 | 7.4 | 20.0 |
| 4 wk | 28.0 | 6.5 | 18.0 | 28.0 | 6.9 | 20.0 | 26.0 | 8.3 | 22.0 |
| 6 wk | 26.0 | 7.0 | 19.0 | 26.0 | 7.4 | 22.0 | 26.0 | 8.9 | 24.0 |
| 8 wk | 26.0 | 6.7 | 19.0 | 26.0 | 7.6 | 20.0 | 26.0 | 9.3 | 22.0 |
| 10 wk | 24.0 | 7.4 | 22.0 | 24.0 | 8.5 | 22.0 | 24.0 | 9.6 | 30.0 |
| Average | 26.33 | 6.60 | 18.50 | 26.00 | 7.10 | 19.67 | 25.67 | 8.18 | 22.17 |
| Standard Deviation | 1.51 | 0.61 | 2.26 | 1.26 | 0.98 | 2.58 | 0.82 | 1.49 | 4.92 |

Red Color values for the samples are provided in Table 7.

TABLE 7

Physical vs. Interesterified Blend Red Color Values

| | 70° F. | | | 85° F. | | | 100° F. | | |
|---|---|---|---|---|---|---|---|---|---|
| | Pure *Echium* | Physical | Interesterified | Pure *Echium* | Physical | Interesterified | Pure *Echium* | Physical | Interesterified |
| Time Zero | 2.3 | 1.0 | 2.0 | 2.3 | 1.0 | 2.0 | 2.3 | 1.0 | 2.0 |
| 2 wk | 3.0 | 0.9 | 2.0 | 3.0 | 0.9 | 2.1 | 3.0 | 1.0 | 2.3 |
| 4 wk | 2.8 | 0.9 | 1.9 | 3.1 | 0.9 | 2.2 | 3.0 | 0.9 | 2.6 |
| 6 wk | 2.8 | 0.9 | 2.0 | 2.9 | 0.9 | 2.3 | 2.9 | 1.0 | 2.7 |
| 8 wk | 2.9 | 1.5 | 2.6 | 2.9 | 1.2 | 3.1 | 2.9 | 2.0 | 2.9 |
| 10 wk | 3.2 | 0.9 | 2.2 | 3.1 | 0.9 | 2.6 | 3.0 | 1.0 | 2.8 |
| Average | 2.83 | 1.02 | 2.12 | 2.88 | 0.97 | 2.38 | 2.85 | 1.15 | 2.55 |
| Standard Deviation | 0.30 | 0.24 | 0.26 | 0.30 | 0.12 | 0.41 | 0.27 | 0.42 | 0.34 |

SDA values for the samples are provided in Table 7.

TABLE 7

Physical vs. Interesterified Blend SDA Values

| | 70° F. | | 85° F. | | 100° F. | |
|---|---|---|---|---|---|---|
| | Physical | Interesterified | Physical | Interesterified | Physical | Interesterified |
| Time Zero | 4.03% | 3.76% | 4.03% | 3.76% | 4.03% | 3.76% |
| 2 wk | 4.05% | 3.64% | 3.98% | 3.75% | 4.05% | 3.74% |
| 4 wk | 4.08% | 3.87% | 4.03% | 3.84% | 4.06% | 3.75% |
| 6 wk | 4.12% | 3.91% | 4.14% | 3.90% | 4.12% | 3.89% |
| 8 wk | 4.12% | 3.88% | 4.10% | 3.83% | 4.11% | 3.84% |
| 10 wk | 4.10% | 3.82% | 4.10% | 3.86% | 4.11% | 3.86% |
| Average | 4.08% | 3.81% | 4.06% | 3.82% | 4.08% | 3.81% |
| Standard Deviation | 0.00 | 0.00 | 0.00 | 0.00 | 0.00 | 0.00 |

As seen from the data in Table 2, the physical and interesterified blends were comparable with respect to peroxide value along the course of the study. At 70° F. interesterified sample performed better than the pure *echium* oil and the physical blend. At the elevated (85° F. and 100° F.) interesterified blends' peroxide values were higher than the physical blend towards the end of the study; however on average the peroxide value was lower in the interesterified blends. The pure *echium* oil had a significant increase in peroxide value over the course of the study within all three temperature environments.

As seen from the data in Table 3, on average, there were no significant changes in FFA values between physical vs. chemically interesterified blends during the course of the 10 week study. The pure *echium* oil had higher FFA values than the both the physical and chemically interesterified blends.

As seen from the data in Table 4, at 70° F. physical blend samples displayed the slowest decrease in OSI values and ended up having the highest OSI values when compared to the interesterified blend. Although the physical blend samples have higher OSI values than the interesterified blend, the optimal storage temperature environment for both blends appears to 70° F. The data demonstrates that the physical blends did well as compared to the interesterified blend for OSI study. Both the physical and interesterified blends were significantly more stable than the pure *echium* oil across all three temperature environments during the course of the study.

As seen from the data in Table 5, the interesterified blend samples have significantly lower anisidine values when compared to the physical blend and pure *echium* oil samples.

As seen from the data in Table 6, the yellow color increased at a steady pace during the duration of the study. The yellow color in the interesterified samples started out darker that the physical which may be attributed to the processing of the oil. The pure *echium* oil was darker over the course of the study in comparison to the physical and chemically interesterified blends.

As seen from the data in Table 7, the red color increased at a steady pace during the duration of the study. The red color in the interesterified samples started out darker than the physical which may be attributed to the processing of the oil. The pure *echium* oil was darker than the physical and chemically interesterified blends.

As seen in the data above, it was observed that the SDA present within the physical and chemically interesterified oils did not degrade over the course of the 10 weeks. The interesterified SDA percentages are slightly lower than the physical blend due to slight overage while batching.

Based on the calculations of SDA content present in the *echium* oil, theoretical content of SDA in interesterified blind is 3.798% SDA. The actual interesterified values match the theoretical values.

Example 8

Expert Sensory Panel

In this study, the oil samples were tested for changes in flavor notes between the physical and interesterified blends at varying temperature environments by an Expert Sensory Panel. The temperatures used in the study were 70° F. and 85° F. The data from the sensory study is shown below in Tables 8 and 9. If none of the panelist observed a flavor, then the value was zero.

TABLE 8

Physical vs. Interesterified Delta SDA 70° F. Expert Sensory Panel Flavor Attribute Averages

| Attribute | Time Zero Physical | Time Zero Interester. | 2 Weeks Physical | 2 Weeks Interester. | 4 Weeks Physical | 4 Weeks Interester. | 6 Weeks Physical | 6 Weeks Interester. | 8 Weeks Physical | 8 Weeks Interester. | 10 Weeks Physical | 10 Weeks Interester. |
|---|---|---|---|---|---|---|---|---|---|---|---|---|
| Beany | 2.4 | 2.0 | 1.5 | 0.4 | 1.7 | 1.2 | 1.5 | 1.3 | 0.8 | 1.5 | 1.4 | 1.1 |
| Stale | 0.2 | 0.0 | 0.4 | 0.0 | 0.0 | 0.4 | 0.7 | 0.2 | 0.0 | 0.0 | 0.6 | 0.2 |
| Grassy | 1.4 | 0.8 | 1.9 | 0.5 | 0.8 | 0.6 | 1.9 | 1.3 | 1.0 | 1.6 | 1.7 | 1.8 |
| Fishy | 1.0 | 0.0 | 0.5 | 0.6 | 0.9 | 0.4 | 1.0 | 0.0 | 1.2 | 0.2 | 1.5 | 0.7 |
| Rancid | 0.8 | 0.6 | 0.8 | 0.1 | 1.1 | 0.5 | 0.4 | 0.0 | 1.3 | 0.1 | 0.7 | 0.0 |
| Nutty | 0.7 | 1.1 | 0.5 | 0.6 | 0.6 | 1.4 | 1.2 | 0.9 | 0.2 | 0.7 | 0.3 | 0.9 |
| Fruity | 0.8 | 0.5 | 1.0 | 0.0 | 0.2 | 0.5 | 0.1 | 0.1 | 0.0 | 0.0 | 0.0 | 0.0 |
| Earthy | 1.0 | 1.1 | 0.7 | 0.6 | 0.8 | 1.1 | 1.0 | 0.4 | 1.5 | 1.4 | 1.3 | 1.3 |
| Rubbery | 0.0 | 0.1 | 0.9 | 0.3 | 0.6 | 0.2 | 0.7 | 0.0 | 0.7 | 0.8 | 0.9 | 0.1 |
| Painty | 0.0 | 0.0 | 0.0 | 0.7 | 0.0 | 0.0 | 0.5 | 0.0 | 0.2 | 0.5 | 0.2 | 0.0 |
| Plastic | 0.0 | 0.0 | 0.0 | 0.3 | 0.0 | 0.0 | 0.0 | 0.0 | 0.0 | 0.0 | 0.0 | 0.0 |

TABLE 9

Physical vs. Interesterified Delta SDA 85° F. Expert Sensory Panel Flavor Attribute Averages

| Attribute | Time Zero Physical | Time Zero Interester. | 2 Weeks Physical | 2 Weeks Interester. | 4 Weeks Physical | 4 Weeks Interester. | 6 Weeks Physical | 6 Weeks Interester. | 8 Weeks Physical | 8 Weeks Interester. | 10 Weeks Physical | 10 Weeks Interester. |
|---|---|---|---|---|---|---|---|---|---|---|---|---|
| Beany | 2.4 | 2.0 | 1.0 | 1.9 | 0.9 | 0.8 | 1.1 | 1.0 | 0.2 | 1.5 | 1.3 | 0.9 |
| Stale | 0.2 | 0.0 | 0.6 | 0.0 | 0.6 | 0.6 | 0.3 | 0.2 | 0.0 | 0.1 | 0.0 | 0.0 |
| Grassy | 1.4 | 0.8 | 0.8 | 1.0 | 1.5 | 1.0 | 1.5 | 0.7 | 1.2 | 0.4 | 1.5 | 2.1 |
| Fishy | 1.0 | 0.0 | 0.6 | 0.1 | 1.5 | 1.5 | 1.7 | 0.8 | 1.9 | 1.3 | 3.5 | 0.6 |
| Rancid | 0.8 | 0.6 | 0.4 | 0.3 | 1.1 | 0.9 | 0.8 | 0.6 | 1.0 | 0.5 | 0.1 | 0.4 |
| Nutty | 0.7 | 1.1 | 0.7 | 0.4 | 0.9 | 0.0 | 1.1 | 0.5 | 0.3 | 0.2 | 0.1 | 0.7 |
| Fruity | 0.8 | 0.5 | 0.2 | 0.0 | 0.4 | 0.4 | 0.0 | 0.6 | 0.0 | 0.0 | 0.0 | 0.0 |
| Earthy | 1.0 | 1.1 | 1.5 | 0.9 | 0.3 | 0.9 | 1.1 | 1.3 | 1.1 | 1.1 | 1.3 | 1.3 |
| Rubbery | 0.0 | 0.1 | 0.1 | 0.0 | 0.9 | 0.4 | 1.0 | 0.5 | 1.4 | 0.7 | 1.1 | 1.3 |
| Painty | 0.0 | 0.0 | 0.2 | 0.0 | 0.4 | 0.2 | 0.0 | 0.3 | 1.3 | 0.1 | 0.3 | 0.2 |
| Plastic | 0.0 | 0.0 | 0.0 | 0.5 | 0.0 | 0.0 | 0.0 | 0.0 | 0.0 | 0.0 | 0.0 | 0.0 |

The beany flavor was observed at a more intense rating in the physical blend when compared to the interesterified blend in the 70° F. environments. The 85° F. environment's interesterified blend had a higher intensity rating in comparison to the physical blend.

The stale flavor was observed at a more intense rating in the physical blend when compared to the interesterified blend in the 70° F. environments. The 85° F. environment's physical blend had a higher intensity rating earlier in the study when compared to the interesterified blend.

The interesterified blend on average had a lower grassy note over the course of the study in comparison to the physical blend.

The fishy flavor was constantly observed in the physical blend and typically more intense when compared to the interesterified blend.

In the 70° F. environment samples, the panelist observed more intense rancid flavors within the physical blend samples when compared to the interesterified blends.

The nutty notes observed by the panelist were present in chemically interesterified blends more than the physical blends.

The fruity notes observed by the panelist were present in chemically interesterified blends more than the physical blends.

The earthy notes observed by the panelist are similar in both the physical and chemically interesterified blends.

The physical blend had more intense rubber notes than the chemically interesterified blends.

The physical blend had more intense painty notes than the chemically interesterified blends.

The data shows that the interesterified oil is less likely to develop as many negative off-notes over time when compared to the physical blended oil especially in regards to fishy, rancid, and painty notes. The panelists observed that the interesterified samples tended to be very clean and pleasant in contrast to the physical blend samples often being described as fishy or rancid.

Example 9

Use in Marinates

In this study, the interesterified oil samples were used to prepare marinates using the following formula. Duplicate batches were prepared for each marinate with each oil to be tested.

White Wine Marinate
1½ cup of white wine
¼ cup of oil
1 small onion, sliced
1 lemon, quartered and squeezed
1 tablespoon dry tarragon
1 teaspoon black pepper Lime and Chili Marinate
1 cup lime juice
1½ jalapeno pepper
4 garlic cloves
1 large onion, sliced
1 teaspoon cayenne pepper
½ teaspoon salt
¼ cup of oil Approximately 16 ounces of chicken breast meat which had been cut into strips were added to the White Wine Marinate made with interesterified oil and White Wine Marinate made with extra virgin olive oil. Both chicken and marinate mixtures were stored over night in the refrigerator.

Identical electric skillets were heated to 300° F. One tablespoon of each oil were added to each skillet. Chicken strips were added to the skillet and cooked until done. Chicken strips were removed and 200 g samples were collected for analysis.

Approximately 12 ounces of Flank Steak mean which had been cut into strips were added to the Lime and Chili Marinate made with interesterified oil and Lime and Chili Marinate made with extra virgin olive oil. Both steak and marinate mixtures were stored over night in the refrigerator.

Identical electric skillets were heated to 375° F. One tablespoon of each oil were added to each skillet. Flank steak strips were added to the skillet and cooked until done. Steak strips were removed and 200 g samples were collected for analysis.

The interesterified oil samples were compared to the control (soybean oil). No flavor off-notes were observed from the interesterified oil samples. The interesterified oil samples had slight smoke present which is typical due to the MCT's present within the structured lipid.

Example 10

Use in Baking

In this study, the interesterified oil samples and vegetable oil were used to bake a cake using a Yellow Cake Mix from Duncan Hines® and to bake brownies using a Brownie Mix from Duncan Hines®.

The test oil and vegetable oil produced very similar results. No difference was observed in appearance or flavor.

Example 11

Use in Stir-Fry

In this study, the interesterified oil sample is used in a Stir-fry. About ¼ cup of oil is added to an electric skillet and heated to about 325° F. Vegetable oil is used as control. About 150 g of ½ inch diced chicken and 300 g of stir-fry vegetables are added to the skillet and stirred for about 4 minutes.

In Examples 9-11, the amount of stearidonic acid in the oil samples used and the amount of stearidonic acid migrated into the food products were analyzed using routine analytical methods. Table 10 below provides the amounts in each food product tested.

TABLE 10

Delta SDA Migration Chart

| Sample Type | % SDA | % Migration |
|---|---|---|
| Baseline Oil | 4.35 | 100.00 |
| Stir-Fry Meat & Vegetables | 4.02 | 92.00 |
| Brownie | 2.91 | 67.00 |
| Yellow Cake | 2.76 | 63.00 |

TABLE 10-continued

Delta SDA Migration Chart

| Sample Type | % SDA | % Migration |
|---|---|---|
| Muffins | 2.35 | 54.00 |
| Chicken Marinade | 2.07 | 47.60 |
| Beef Marinade | 1.00 | 23.00 |

Example 11

Deodorizer Temperature Study

The interesterified oil was prepared using the proportions described for Example 4. The reaction mixture was divided in two batches. One batch was subjected to a deodorization step by maintaining at a temperature of 214° C.-226° C. (417.2° F.-438.8° F.) under a vacuum of about 0.495-0.76 mbar for about 4 hours. The other batch was subjected to a deodorization step by maintaining at a temperature of 226.2° C.-232.2° C. under a vacuum of about 0.495-0.76 mbar for about 4 hours.

SDA percentage before and after deodorization steps is provided in Table 11 below.

TABLE 11

| | SDA percentage | |
|---|---|---|
| | Temp. 226.2° C.-232.2° C. | Temp. 214° C.-226° C. |
| Before Deodorization | 4.42% | 4.71% |
| After Deodorization | 3.70% | 4.37% |
| Retain Rate | 83.71% | 92.78% |

As seen from the data, the lower deodorization temperature retains higher SDA in the sample.

The embodiments of the claimed subject matter described above are intended to be merely exemplary, and those skilled in the art will recognize, or will be able to ascertain using no more than routine experimentation, numerous equivalents of specific compounds, materials, and procedures. All such equivalents are considered to be within the scope of the claimed subject matter and are encompassed by the appended claims.

What is claimed is:

1. A composition comprising an interesterified structured lipid component and one or more components selected from a phytosterol ester and an additional edible oil; the structured lipid component being a reaction product of an interesterification reactant charge, the reactant charge comprising (i) an amount of a medium chain triglyceride having fatty acid chains from C6 to C12 in length, (ii) an amount of a long chain domestic oil having fatty acids chains of at least C16 in length, and (iii) an amount of a source of stearidonic acid, wherein the source of stearidonic acid is *Echium* oil.

2. The composition of claim 1, wherein the amount of *Echium* oil in the interesterification charge is about 20-40 weight percent.

3. The composition of claim 2, wherein the amount of *Echium* oil in the interesterification charge is about 30 weight percent.

4. The composition of claim 1, wherein the medium chain triglyceride is selected from the group consisting of caprylic triglyceride, capric triglyceride, and combinations thereof.

5. The composition of claim 1, wherein the long chain domestic oil is selected from the group consisting of soybean oil, corn oil, cottonseed oil, canola oil, olive oil, peanut oil, safflower oil, sunflower oil, oil from grain plants, and combinations thereof.

6. The composition of claim 1, wherein the amount of medium chain triglyceride is about 30 to 40 weight percent of the interesterification charge.

7. The composition of claim 1, wherein the amount of the domestic oil is about 30 to 40 weight percent of the interesterification charge.

8. The composition of claim 1, wherein the amount of medium chain triglyceride is about 35 weight percent and the amount of the domestic oil is about 35 weight percent of the interesterification charge.

\* \* \* \* \*